United States Patent [19]

Heger

[11] Patent Number: 5,543,799
[45] Date of Patent: Aug. 6, 1996

[54] SWEPT RANGE GATE RADAR SYSTEM FOR DETECTION OF NEARBY OBJECTS

[75] Inventor: Charles E. Heger, Saratoga, Calif.

[73] Assignee: Zircon Corporation, Campbell, Calif.

[21] Appl. No.: 300,279

[22] Filed: Sep. 2, 1994

[51] Int. Cl.⁶ .................................................. G01S 13/18
[52] U.S. Cl. ............................... 342/85; 342/21; 342/22; 342/137
[58] Field of Search .................................. 342/21, 22, 85, 342/94, 95, 136, 137; 367/88, 95, 98, 101, 105, 908; 324/329

[56] References Cited

U.S. PATENT DOCUMENTS

| | | |
|---|---|---|
| 3,278,843 | 10/1966 | Deming et al. . |
| 3,569,971 | 3/1971 | Griffee ......................... 343/725 |
| 3,710,387 | 1/1973 | Hinchman et al. ............... 342/145 |
| 4,015,264 | 3/1977 | Koerner ......................... 343/725 |
| 4,041,382 | 8/1977 | Washburn . |
| 4,067,225 | 1/1978 | Dorman et al. . |
| 4,086,528 | 4/1978 | Walton . |
| 4,109,255 | 8/1978 | Silliman ......................... 343/853 |
| 4,125,835 | 11/1978 | Barry ............................. 342/94 |
| 4,130,796 | 12/1978 | Shum . |
| 4,322,678 | 3/1982 | Capots et al. . |
| 4,464,622 | 8/1984 | Franklin . |
| 4,676,100 | 6/1987 | Eichberger . |
| 4,728,953 | 3/1988 | Richmond ....................... 342/91 |
| 4,847,552 | 7/1989 | Howard . |
| 4,853,617 | 8/1989 | Douglas et al. . |
| 4,896,116 | 1/1990 | Nagashima et al. ............... 342/22 |
| 4,939,455 | 7/1990 | Tsugawa et al. . |
| 4,947,116 | 8/1990 | Welcome et al. . |
| 4,992,741 | 2/1991 | Douglas et al. . |
| 5,023,484 | 6/1991 | Pathak et al. . |
| 5,023,594 | 6/1991 | Wallace . |
| 5,089,704 | 2/1992 | Perkins . |
| 5,148,175 | 9/1992 | Woolfolk ......................... 342/95 |
| 5,164,703 | 11/1992 | Rickman . |
| 5,196,826 | 3/1993 | Whiting . |
| 5,274,271 | 12/1993 | McEwan . |
| 5,332,938 | 7/1994 | McEwan . |
| 5,352,974 | 10/1994 | Heger . |
| 5,361,070 | 11/1994 | McEwan ......................... 342/21 |

FOREIGN PATENT DOCUMENTS

WO94/06121   3/1994   WIPO .

Primary Examiner—Ian J. Lobo
Attorney, Agent, or Firm—Skjerven, Morrill, MacPherson, Franklin & Friel; Norman R. Klivans

[57] ABSTRACT

A cost-effective ultra-wideband radar system capable of locating nearby buried objects such as reinforcing steel rods, pipes, and other objects buried in concrete, soil, behind walls, or in the air. A sequence of ultra-wideband radar pulses are emitted without a carrier and the system detects deflected pulse energy caused by the transmitted pulse whenever encountering a change in the medium i.e. an air to metal change or concrete to metal change. This reflected energy is detected and visually displayed. The range gate delay is continuously varied, thus changing the distance from the unit to where the reflected energy would be potentially detected from the target. By continuously sweeping the "depth" of the scan, the operator need only move the unit in two dimensions across the surface to detect objects buried or hidden at varying depths interior to or behind the surface. The range gate system includes a multipoint background subtraction, corrected gain with distance, linear range gate time correction and a dielectric constant correction for a calibrated distance display.

15 Claims, 5 Drawing Sheets

SWEPT RANGE GATE RADAR SYSTEM FOR DETECTION OF NEARBY OBJECTS

BACKGROUND OF THE INVENTION

1. Field of the Invention

This invention relates to radar systems, and more specifically to a short range and inexpensive radar system for use in locating reinforcing steel rods, pipes, and other nearby objects buried in concrete, soil, or behind walls and other applications.

2. Description of the Prior Art

A requirement exists for a cost-effective system capable of locating reinforcing steel rods (rebar), pipes, and other objects buried in concrete, soil, behind walls, etc. Various devices and systems currently exist to locate these various objects, but all are either limited in capability or very costly.

Zircon Corporation, Campbell, Calif., currently produces an electronic stud sensor for locating wooden and metal wall studs behind sheetrock and can sense studs up to 1" to 1½" deep beneath other material such as sheetrock, plywood, etc.

Lawrence Livermore National Laboratory (LLNL) has developed an ultra-wideband (UWB) radar technology applicable to produce a stud-sensing type of apparatus. See U.S. patent application Ser. No. 08/058,398 entitled "Impulse Radar Stud Finder", filed May 7 1993, invented by Thomas Edward McEwan, incorporated by reference.

See also U.S. patent application Ser. No. 08/044,717 entitled "Ultra-Wideband Motion Sensor," now U.S. Pat. No. 5,361,070; and Ser. No. 08/044,745 entitled "A Differential Receiver for Ultra-Wideband Signals filed Sep. 1, 1992, both invented by Thomas Edward McEwan and also incorporated by reference. Unlike the Zircon product which relies upon sensing a change in density via capacitive loading, the above-described LLNL technology as shown in present FIG. 1 emits a sequence of ultra-wideband radar pulses without a carrier and detects deflected pulse energy caused by the transmitted pulse wavefront encountering a change in medium, i.e., air-to-metal or concrete-to-metal, hereafter referred to as the target. This reflected energy is detected and visually displayed.

Figure 1:
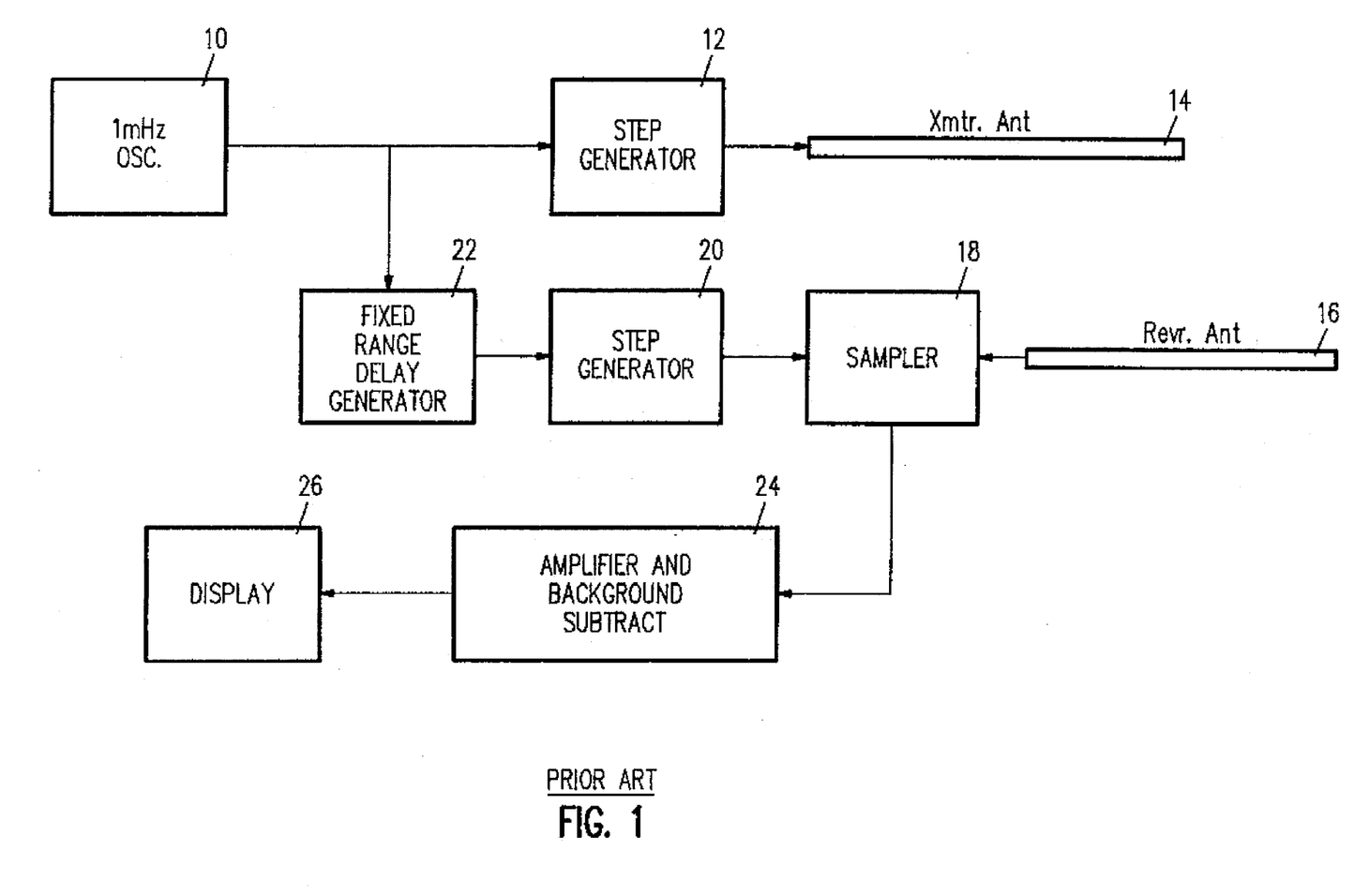
FIG. 1 shows a prior art fixed range gate radar system.

The LLNL technology generates a fast pulse (typically 100 to 1000 ps wide) from a 1 MHz oscillator 10 driving a step generator 12 which is coupled to a transmit antenna 14. A separate receive antenna 16 is coupled to a sampler circuit 18 which is gated on with a delayed version of the transmit pulse by a fixed range delay generator 22 driving a second step generator 20. The receiver (including sampler circuit 18 feeding amplifier and background subtract circuit 24 coupled to display 26) thus "looks" for reflected energy at a fixed time delay after the transmit pulse has occurred. This generates a so-called "range gate", which is well known in the radar field.

This fixed range gate allows detection of objects at a fixed physical distance from the unit as dictated by a) the unit's range gate delay, b) the material(s) the pulse energy is passing through and c) the speed of light.

In a fairly fixed and repeatable situation such as sensing wall studs behind sheetrock, the range gate delay time can be fixed at a standard distance because little variation occurs in home and other building construction techniques. However, if a broad variety of sensing applications is required such as those described above, then it has been found that a fixed range gate delay unit will not suffice. The operator could have a manually variable range gate control, but this would require: a) physical scanning with the unit in both vertical and horizontal planes across a surface, b) changing the range gate control at each point desired to scan and c) doing a new background subtract (recalibration) at each of these range gate settings. This would be a very tedious and error-prone type of operation.

SUMMARY OF THE INVENTION

The present invention improves upon the prior art fixed range gate delay approach for UWB radar by continuously varying the range gate delay, thus changing the distance from the unit to where reflected energy would be potentially detected from a target. By continuously sweeping the "depth" of the scan, the operator need only move the unit in two dimensions across a surface to detect objects-buried or hidden at varying depths interior to or behind the surface, or otherwise spaced apart from the unit.

Several technical problems have been both discovered and solved by the present inventor to accomplish this. First, at any given range gate delay, it has been found that a certain amount of random, reflected energy will be returned to the receive antenna. This "clutter" is due primarily to finite transmit and receive antenna structure and circuit isolation. To accommodate a cost-effect solution without resorting to much more costly microwave techniques, a certain amount of this clutter is tolerated. The "background subtract" circuit in prior art FIG. 1 does a single one-time subtraction at calibration and removes or subtracts these residual, unwanted return signals which, for a single, fixed range gate delay, will be fairly constant for any given physical orientation such as scanning a sheetrock wall.

If, however, the range gate is continuously varied, it has been found that the "background clutter" also continuously varies in a random fashion in synchronicity with the range gate sweep. To overcome this, in accordance with the invention the range gate is stepped in small increments and at each step, a unique background removal value is sensed and stored in an initial calibration routine. Once accomplished in any physical sensing situation, such as scanning a concrete wall, the stored background values are then subsequently recalled at each range gate step and subtracted from whatever the actual return signal is at that particular range setting, thus leaving for display processing only the change in reflected energy from a "calibrated" situation, such as the detection of embedded rebar in the concrete.

A second problem found with sweeping the range gate is that the reflected energy from a "target" decreases (assuming constant pulse transmit energy) as the square of the distance, as is well known for radio wave propagation. Therefore, a gain that varies proportionally to the square of the range gate delay is incorporated to remove the varying detection distance from the amplitude of the reflected energy. This is important in that the amount of reflected energy has significance as indicating the size and material of the reflecting target.

Thirdly, it has been found that it is desirable that the range gate delay vary in direct linear proportion to the range gate sweep control. This allows a direct calibration "depth" indication of the target from the unit. A correction factor has also been determined to be required to obtain a calibrated depth readout. The dielectric constant ($e_R$) of the bulk material through which the pulse is passing affects the velocity of propagation by the square root of $e_R$. Thus, to obtain the actual depth or distance from the sensing unit's antennas to the reflecting target, a process using the following calculation is used:

$$D=(0.5)(t_D)(C)(e_R)^{1/2}$$

where $D$=distance from antenna(s) to the target, $t_D$=total round trip delay time of pulse, $e_R$=bulk dielectric constant of medium, and c=speed of light The factor of 0.5 is required due to the pulse being a "round trip" from the transmit antenna to the target and back to the receive antenna.

To summarize, a swept range gate system in accordance with the invention may include at least these structures and corresponding methods beyond that required for a prior art fixed range gate unit: linear range gate time; corrected gain with distance; and multi-point background subtraction.
In addition, dielectric constant correction is provided for a calibrated distance display.

While the UWB system disclosed herein operates over a range of 2 MHz to 10 to 15 GHz, having harmonics at each multiple of 2 MHz, this is not limiting.

DETAILED DESCRIPTION OF THE INVENTION

Figure 2:
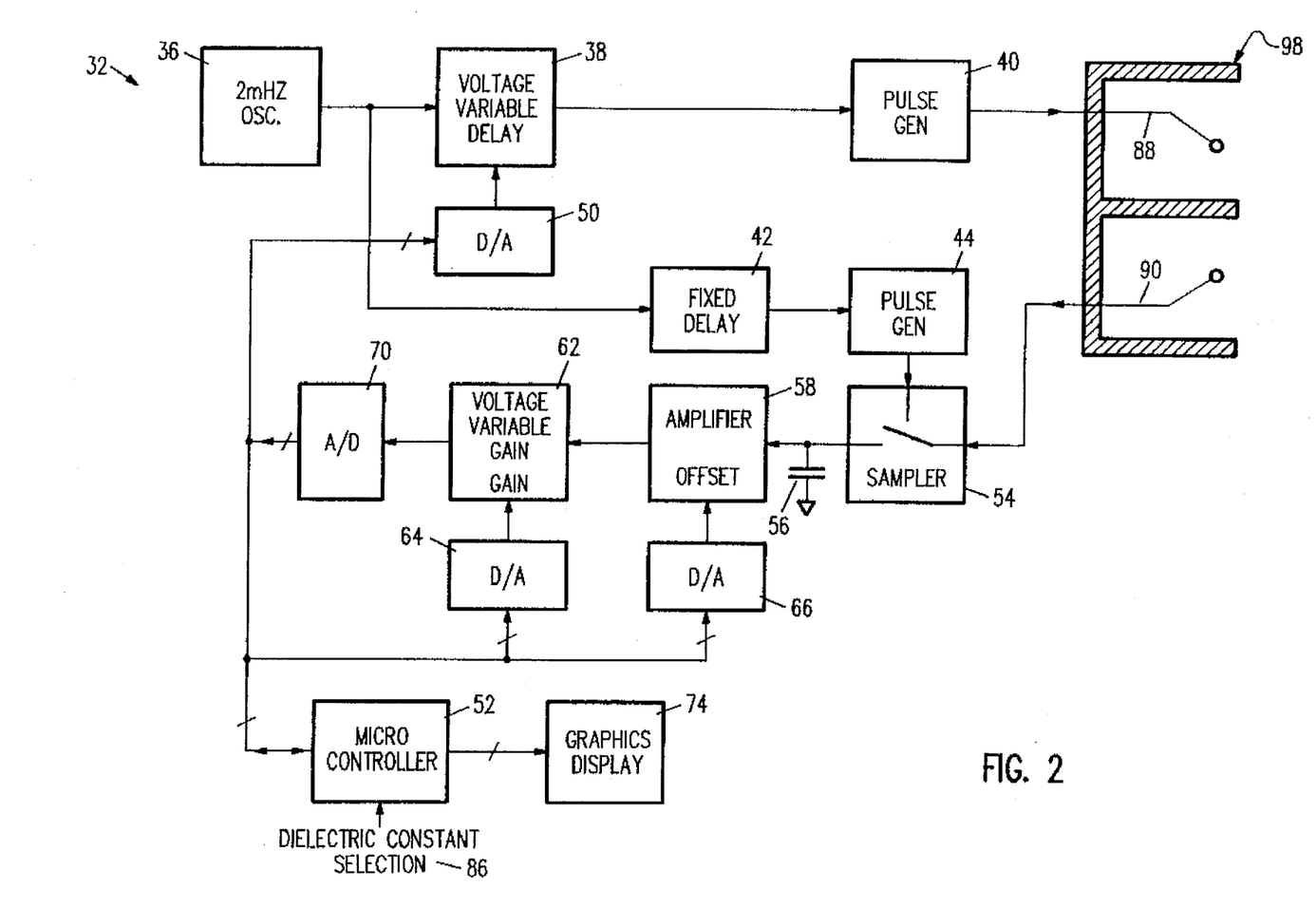
FIG. 2 shows a block diagram of a swept range gate ultra wideband radar system in accordance with the present invention.

The various features in accordance with the invention as described above may be accomplished by a combination of analog and/or digital circuitry and/or software executed e.g. in a microprocessor. FIG. 2 shows one embodiment of a system 32 that includes these features.

A 2 MHz master oscillator 36 drives two paths: a first path via a voltage controlled variable delay circuit 38 and then to the transmit pulse generator 40, and a second path through a fixed delay circuit 42 and then to the receive pulse generator 44. The fixed delay circuit 42 is similar to variable delay circuit 38, without the variable elements (see below, FIG. 6).

The voltage controlled variable delay 38 allows changing the time of the transmit pulse with respect to the receive pulse generator 44, with a digital-to-analog converter (D/A) 50 providing a varying voltage under control of a conventional microcontroller 52. This structure then generates a continuously changing time delay from some minimum to maximum delay time, creating the swept range. A typical sweep frequency is 100 Hz.

The fixed delay in the receiver path is set equal to or greater than the maximum transmit delay. The timing relationship of the transmit pulse generator 40 and receive pulse generator 44 then determines the distance range over which the unit will scan.

Figure 3:
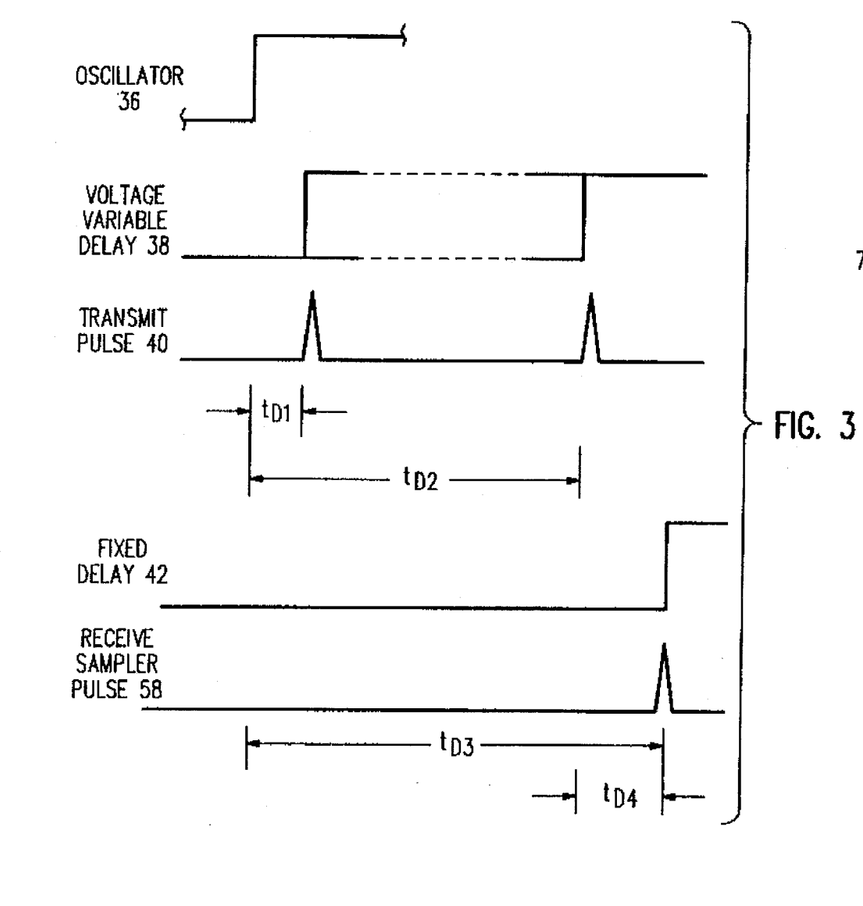
FIG. 3 shows waveforms illustrating the swept range gate system timing of the system of FIG. 2.

FIG. 3 depicts this timing by waveforms showing the output signals of various portions of the unit 32. The configuration of FIGS. 2 and 3 is thus opposite that conventionally used in radar systems where the transmit pulse time is fixed and the receiver gate time is varied. (The conventional configuration may be utilized for the present invention but is not the preferred embodiment.) Sweeping the receive delay conventionally has been found to create additional background clutter due to extraneous signal coupling in the presence of high gain amplifiers and "droop" on the sampler hold capacitor 56, undesirably creating a phase-modulated replica of the range sweep control voltage. These disadvantages are eliminated when the transmit pulse is varied instead.

With reference to FIG. 3, times $t_{D1}$ and $t_{D2}$ are the minimum and maximum respectively of the transmit voltage-controlled pulse delay 38. The receive pulse delay 42 is fixed at $t_{D3}$. Thus, the minimum range is set by $t_{D3}-t_{D2}=t_{D4}$ (which could be equal to zero). The maximum range is $t_{D3}-t_{D1}$. The transmit delay can be any value between these limits as defined by the microcontroller 52 via the D/A 50 driving the voltage variable delay circuit 38.

In operation, when the delay between the transmit 40 and receive pulse generator 44 is equal to the round trip transit time of the transmit pulse reflecting off a target, the receive sampler 54 will be turned on coincident with the arrival of the return echo and the sampled and held signal is amplified by amplifier 58.

Prior to any actual sensing, a calibration process is performed to remove the background "clutter". At each finite range gate control voltage from D/A 50, with the gain of voltage variable gain circuit 62 set via D/A 64 to a previously determined setting, offset D/A 66 driving the offset voltage control of amplifier 58 is varied with a successive approximation routine (or other search routine resident in microprocessor 52) until the output of A/D 70 is at mid-range. The offset binary number (value) driving offset D/A 66 is then stored in microcontroller 52 memory and the range gate D/A 50 is stepped to the next value along with the appropriate gain control D/A 64 binary number (value). The offset D/A 66 search routine is repeated and the number saved. This process is repeated until all range gate control settings have been processed in this manner. (It is to be understood that writing a software routine carrying this out via microprocessor/microcontroller 52 is well within the ability of one of ordinary skill in the art.) The variable gain circuit 62 is any circuit for varying a gain by a voltage control. The unit 32 must be physically stable with relationship to a surface or pointed into the surface as this routine is performed. (This calibration process is applicable, with appropriate readily apparent modifications, to an UWB radar system where the receiver is range swept rather than the transmitter.)

After initial calibration, normal operation can commence. At each range gate D/A 50 setting, the offset D/A 66 and gain D/A 64 settings associated with this range are recalled by the microcontroller 52. With no echo at any range settling, the output of A/D (analog to digital converter) 70 will always be at mid-scale, as any previous background is subtracted out by the offset D/A 66. If, however, an echo is present representing a target at some given distance and range gate setting, the A/D 70 output will not be mid-scale but some other value. This difference from mid-scale is then processed by the microcontroller 52 and displayed on graphics display 74.

Display

The described system provides a number from the A/D 70 related to the strength of the return echo which is uniquely associated with a given range value. The display 74 (e.g., an LCD or other conventional display) therefore, has two pieces of information to visually display: amplitude and range. All physical movement of the unit 32 over the surface being scanned is done by the operator, with any given display presentation being uniquely associated with a given position of the unit on the surface. Thus the operator has physical control of the X and Y coordinates (i.e. the surface being scanned) and the unit 32 scans electronically via the range gate the Z axis (i.e. into, behind, etc., the surface being scanned). ("Surface" need not be a structure per se but could be merely the surface of unit 32 where it is in contact with the air.) Any change in amplitude on the display can now be associated with a unique point within the volume of the object being scanned (X, Y & Z) with amplitude giving an indication of size and material, of objects buried/hidden interior to the volume.

Figure 4:
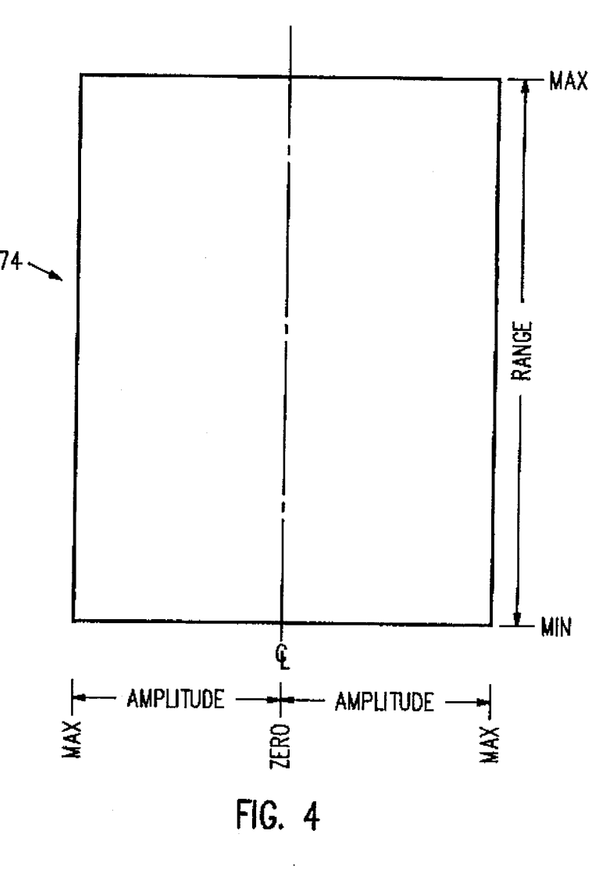
FIG. 4 shows a diagram of a display as used in accordance with the system of FIG. 2.
Figure 5A:
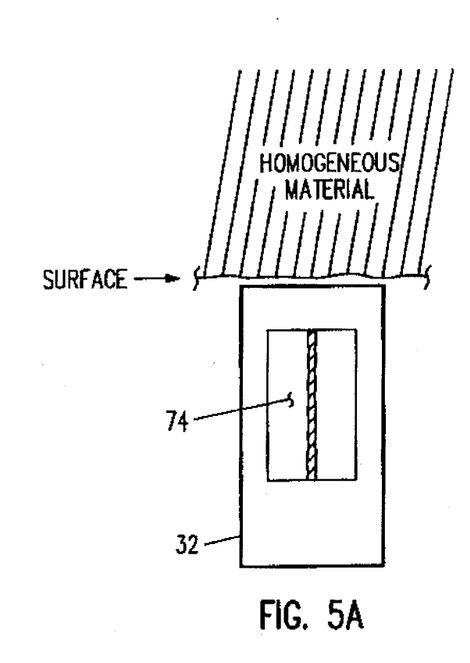
FIG. 5A, 5B and BC show examples of a display corresponding to particular detection situations in accordance with the present invention.
Figure 5B:
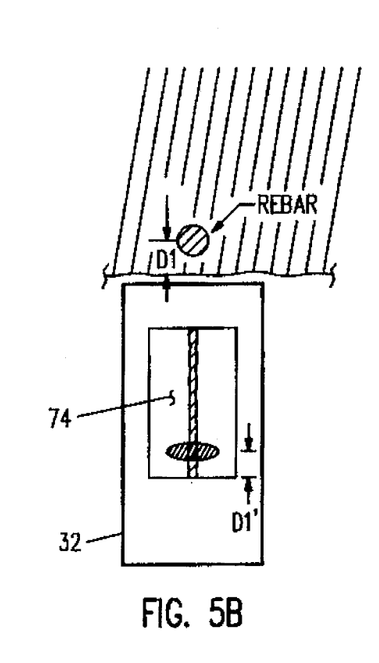
Figure 5C:
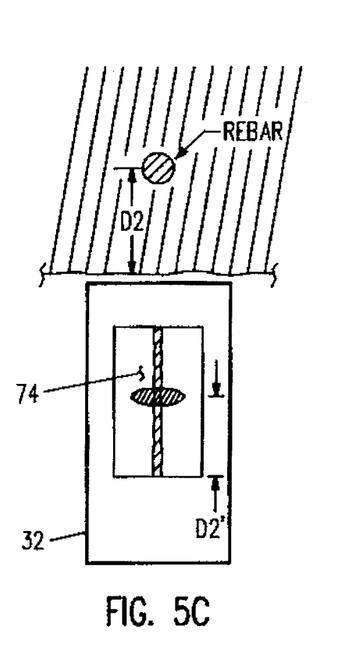

Since the operator is physically doing all X and Y axis scanning, the display 74 should not reflect any bias to either X or Y movement to prevent any operator confusion or misinterpretation. FIG. 4 depicts a planar graphics display as an example of display 74 of FIG. 2 and that has two axis of information: range (Min to Max) and amplitude (zero to Max on either side of the centerline). The display 74, as physically attached to the unit, is orthogonal to the surface being scanned when the unit 32 is in use. The display 74 thus provides a representation of the cross-section of the volume being scanned at that physical location on the surface. The display of amplitude information is in one embodiment "mirror imaged" about the center line shown to eliminate any X-Y bias. FIGS. 5A, 5B, 5C show several display examples.

FIG. 5A shows the display 74 of unit 32 when the volume being scanned contains only homogeneous material within the scan range of the unit.

FIG. 5B shows the detection of metal rebar at depth D1 into the volume and depicted on the display at position D1' indicating the depth.

FIG. 5C is similar to FIG. 5B but with the rebar at a greater depth D2, shown on display 74 at position D2'.

The number of range gate values scanned, the amplitude A/D 70 resolution, number of display 74 pixels, range depth and other system parameters can be varied to suit the intended application.

Range Gate Linearity

As previously mentioned, to obtain a calibrated range display, the range gate (or voltage variable delay) must correlate to a given binary number sent to the variable delay D/A 50. If the voltage-to-delay function of the voltage controlled delay 38 were linear, the D/A 50 output need only be scaled to obtain the required range. However, due to the very small delays required (typically less than 10 ns maximum which equates to 5 feet round trip in air) a convenient method (see FIG. 6) to obtain voltage controlled delay uses fast logic elements 80, 82 (gates such as buffers, inverters, etc. of logics families such as HC and AC) and slightly varies the delay between gates 80, 82 with R-C (resistor-capacitor) delays as shown. Resistor R1 and capacitor C1 delay the output of the first gate 80. Varying the control voltage on resistor R2 can slightly modify this delay. The voltage-to-delay transfer function is not linear, however.

Figure 6:
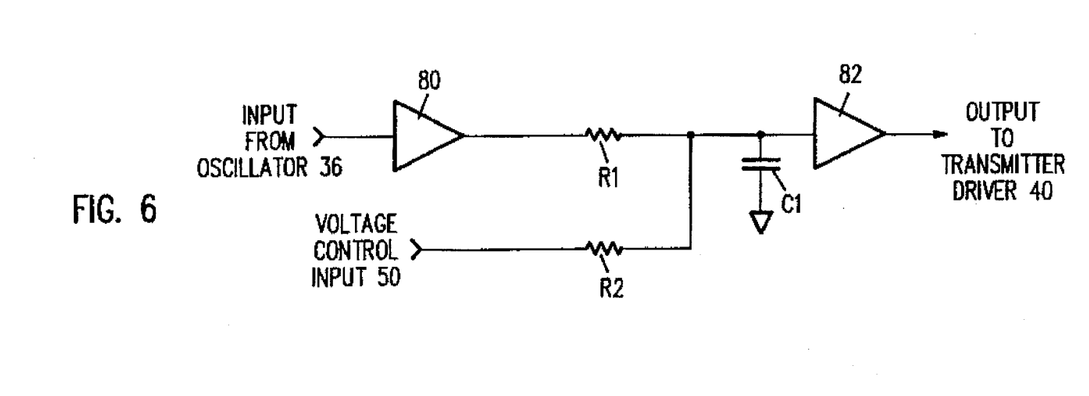
FIG. 6 shows a voltage controlled delay generator in accordance with the present invention.

If the control voltage 50 were alternatively to be driven by a linear sawtooth analog voltage such as from an analog sawtooth generator, means must be provided (not shown) to linearize the time/voltage transfer function.

However, in the system block diagram shown in FIG. 2, the binary word (value) sent to the delay control D/A 50 can be modified to other than a linear binary sequence to correct for any nonlinearities in the circuit of FIG. 6. This linearity correction is part of the microcontroller 50 resident software and once determined for a given design of unit 32 for particular type of logic elements, parts values, etc., would be identical in all other units.

Dielectric Constant Correction

As stated above, the dielectric constant of bulk material being scanned affects the pulse propagation time, and thus is taken into account in accordance with the invention at reference number 86 of FIG. 2 to realize a calibrated "depth" display.

The dielectric constant of various materials is well known and any conventional input device 86 to the microcontroller 52 such as rotary switches, a keypad, etc. (not shown) may be utilized to select the appropriate constant that the microcontroller 52 could then use in the distance (depth) determination described above. A range of $e_R$ from 1 (air) to 80 (water) would cover most potential applications. A printed table of various materials and their $e_R$'s is then attached to the exterior of unit 32, as well as possibly having user controlled switch positions to select a variety of often used applications such as concrete, ½ sheetrock, tile roof, etc. This would simplify the user's operation of unit 32.

Antennas

The prior art device of FIG. 1 uses monopole antennas above a ground plane with no cavities or electro-magnetic field isolation from each other.

It has been found by the present inventor that it is desirable to isolate the transmit and receive antennas as much as possible consistent with other requirements (such as cost and size) so that the receiver need not cope with the very large transmitted pulse, as compared to the much weaker return echo. Also, to obtain the most unambiguous range determination, the transmit pulse is a single pulse with little or no ringing.

Figure 7:
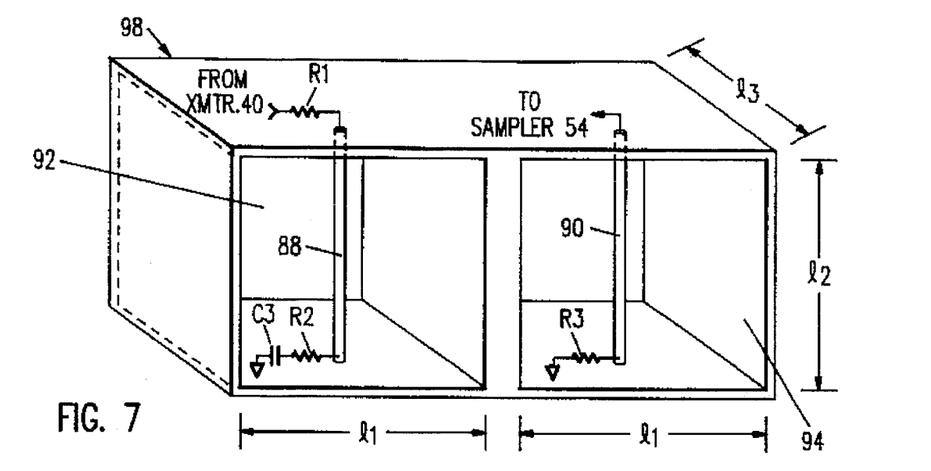
FIG. 7 shows an antenna structure in accordance with the present invention.

It has been found that broadband antenna structures accomplish this. FIG. 7 shows the antenna structure of one embodiment of the present invention. Both the transmit monopole 88 and receive monopole 90 are in separate, rectangular cavities respectively 92, 94 in a metal enclosure 98, which cavities provide isolation and semi-broad bandwidth.

Termination resistors R1, R2 and R3, (not the same as similarly labelled components in FIG. 6) are selected to minimize any ringing. The dimensions 11, 12, 13 are respectively 2.0", 1.5", and 1.0". The lengths 14, 15 of respectively monopoles 88, 90 (see FIGS. 8 and 9) are respectively 1.2" and 1.2".

Figure 8:
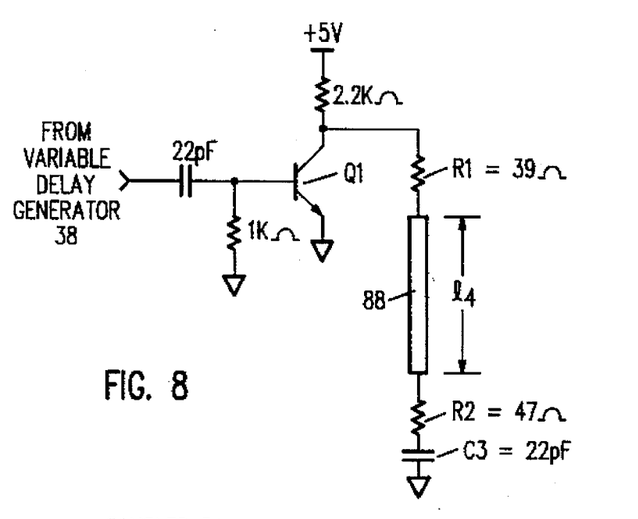
FIG. 8 shows a transmitter in accordance with the present invention.

FIG. 8 shows the transmitter pulse generator 40 and the transmitter monopole 88 and termination components R1, R2 and C3 of FIG. 7. The pulse generator 40 includes transistor Q1 having a value of $f_T$ (unit gain cutoff) greater than or equal to 7 GHz. The base of transistor Q1 is connected as shown via a capacitor to the variable delay generator 38 of FIG. 2.

Figure 9:
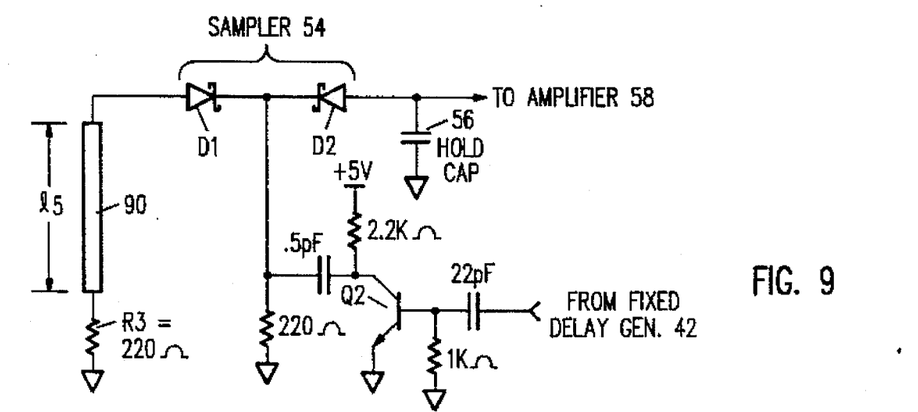
FIG. 9 shows a receiver in accordance with the present invention.

FIG. 9 shows in addition to the receiver sampler 54 and the associated pulse generator 44, which includes pulse generator transistor Q2 as driven by the fixed delay circuit 42, the receive monopole 90 with its termination transistor R3 as in FIG. 7. Transistor Q1 is similar to transistor Q2. The sampler 54 includes two Schottky diodes D1 and D2. One terminal of the hold capacitor 56 is connected to the amplifier 58 of FIG. 2. It is to be understood that the values for the component shown in FIGS. 8 and 9 are exemplary and not limiting.

Monopole antennas, as used herein, are linearly polarized, so that when attempting to detect rod-like objects such as rebar, the axis of the antennas 88, 90 needs to be parallel with the length of the rebar for maximum detection. If the unit 32 were rotated 90 degrees such that the axis of the antennas 88, 90 were perpendicular to the length of the rebar, the signal return would be minimal. This property could be useful in determining the rebar orientation within a medium (i.e. concrete), but requires the operator to be aware of this parameter and search in multiple rotated axis.

If circularly polarized antennas as known in the art were utilized (not shown), both for the receiver and transmitter, the orientation of a rod type target would not matter, as the circular polarization of the waves would not differentiate between various rod rotation positions.

Another antenna embodiment (also not shown) uses circularly polarized antennas which allow various target configurations to be at any orientation without comprising the return echo strength.

If the target is a material surface (such as sheet metal) of a size equal to or larger than the antenna cavities' frontal area, antenna circular polarization (CP) yields no benefits and in fact produces a loss of 3 dB per antenna as CP type antenna structures are well known to produce. Therefore, the choice of antenna for a given sensing situation should take into account the physical configuration of the intended target, and hence various antennas are applicable in accordance with the invention.

A system and method in accordance with the present invention is not limited to the particular applications described above, but has other applications for sensing of objects, not limited to the construction type field. For instance the system is applicable to sensing objects located in air that are relatively near the unit for purposes of security systems, traffic control situations (e.g. for installation in automobile to detect proximity to another automobile or other object), and for other applications requiring detection of objects at a relatively short distance (within 200 feet) where a low cost system is important. This disclosure is illustrative and not limiting. Further modifications will be apparent to one of ordinary skill in the art, and are intended to fall within the scope of the appended claims.

I claim:

1. A transmitter range swept ultra-wideband radar system adapted for sensing a nearby target comprising:

a signal transmitter driven by a continuously variable time delay circuit; and a receiver driven by a fixed time delay circuit and located for receiving the signals transmitted by the transmitter after being reflected from the nearby target;

wherein a pulse time of the transmitter is variable and a gate time of the receiver is fixed.

2. The system of claim 1, wherein the transmitter transmits at a range of frequencies between 2 MHz and about 10 GHz, having harmonics at fixed intervals in the range.

3. The system of claim 1, further comprising:

means for stepping the variable delay in predetermined increments;

means for determining at each increment a received amount of a random, reflected energy background signal which is clutter not from the target;

means for storing the determined amount of the background signal for each increment; and means for subsequently correcting a received signal at a particular variable delay by the stored amount.

4. The system of claim 1, further comprising a first antenna element connected to the receiver, the first antenna element being a first monopole which is resistively loaded and located in a first rectangular cavity having conductive walls.

5. The system of claim 4, further comprising a second antenna element connected to the transmitter, the second antenna element being a second monopole which is resistively loaded and located in a second rectangular cavity having conductive walls.

6. The system of claim 1, further comprising a circularly polarized antenna element connected to the transmitter.

7. The system of claim 1, further comprising a circularly polarized antenna element connected to the receiver.

8. The system of claim 1, further comprising a conductive enclosure defining two rectangular cavities each having conductive walls, a resistively loaded monopole being mounted in each cavity, one of the monopoles being connected to each of the receiver and transmitter.

9. The system of claim 1, further comprising a display operatively connected to the receiver, the display showing in a first dimension a distance of the target from the system and in a second dimension an amplitude of the received signal.

10. The system of claim 9, the display further displaying an image of the distance and amplitude symmetrical about a center line of the display.

11. The system of claim 1, further comprising:

means for indicating a particular dielectric constant of an environment of the target; and means for determining a distance of the target from the system using the indicated dielectric constant.

12. The system of claim 1, further comprising:

means for determining a gain correction value related to any particular distance to the target;

means for applying the correction value to a gain applied to the received signal; and means for displaying the received signal with the corrected gain, thereby to indicate a size and material of the target.

13. The system of claim 1, the variable delay circuit including:

a first logic gate having an output terminal connected to an input terminal of a second logic gate;

a variable voltage being connected to the input terminal of the second logic gate.

14. A range swept ultra-wideband radar system adapted for sensing a nearby target, comprising:

a signal transmitter;

a receiver located for receiving the signals emitted by the transmitter after being reflected from the target;

a variable delay for sweeping a selected one of the emitted and received signals;

means for stepping the variable delay in predetermined increments;

means for determining at each increment a received amount of a random, reflected energy background signal which is clutter not from the target;

means for storing the determined amount of the background signal for each increment; and means for subsequently correcting a received signal at a particular variable delay by the stored amount.

15. A range swept ultra-wideband radar system adapted for sensing a nearby target comprising:

a signal transmitter driven by a continuously variable delay circuit;

a receiver located for receiving the signals transmitted by the transmitter after being reflected from the nearby target;

means for stepping the variable delay in predetermined increments;

means for determining at each increment a received amount of a random, reflected energy background signal which is clutter not from the target;

means for storing the determined amount of the background signal for each increment; and means for subsequently correcting a received signal at a particular variable delay by the stored amount.

* * * * *